US007584161B2

(12) United States Patent (10) Patent No.: US 7,584,161 B2
Forbes et al. (45) Date of Patent: Sep. 1, 2009

(54) SOFTWARE SYSTEM FOR MANAGING INFORMATION IN CONTEXT

(75) Inventors: David Ian Forbes, Falls Church, VA (US); Sharon Flank, Washington, DC (US); David Austin, Falls Church, VA (US)

(73) Assignee: Contextware, Inc., Annandale, VA (US)

(*) Notice: Subject to any disclaimer, the term of this patent is extended or adjusted under 35 U.S.C. 154(b) by 171 days.

(21) Appl. No.: 11/225,138

(22) Filed: Sep. 13, 2005

(65) Prior Publication Data

US 2006/0074726 A1    Apr. 6, 2006

Related U.S. Application Data

(60) Provisional application No. 60/609,845, filed on Sep. 15, 2004.

(51) Int. Cl.
*G06N 5/02* (2006.01)
*G06F 17/00* (2006.01)
(52) U.S. Cl. ............................. 706/46; 705/7; 707/100
(58) Field of Classification Search .................. 706/12, 706/45, 46; 715/713; 340/539
See application file for complete search history.

(56) References Cited

U.S. PATENT DOCUMENTS

| | | | |
|---|---|---|---|
| 5,377,103 A | 12/1994 | Lamberti et al. | |
| 6,219,664 B1 | 4/2001 | Watanabe | |
| 6,601,233 B1* | 7/2003 | Underwood | ............... 717/102 |
| 6,711,585 B1* | 3/2004 | Copperman et al. | ...... 707/104.1 |
| 7,113,954 B2 | 9/2006 | Vogel | |
| 7,177,798 B2 | 2/2007 | Hsu et al. | |
| 2006/0059107 A1* | 3/2006 | Elmore et al. | ................. 705/64 |

OTHER PUBLICATIONS

Borck, J. R., "Appian Puts Polish into BPM, Appian Enterprise 5.1 bolsters collaborative workflow with flexible features and slick modeling," InfoWorld Enterprise Search Spotlight [online], Jul. 21, 2006 [retrieved on Jul. 27, 2006]. Retrieved from the Internet: <URL: http://ww6.infoworld.com/products/print_friendly.jsp?link=/article/0...>, pp. 1-2.

(Continued)

*Primary Examiner*—David R Vincent
*Assistant Examiner*—Kalpana Bharadwaj

(57) ABSTRACT

A software system that uses the rigor and rules of business process automation to capture and structure organizational expertise, processes, and procedures—the non-automatable activities and actions of an organization—into a single, common, enterprise-wide, information framework. The capture function is engineered for usability and structured to reflect the patterns and semantics of business users rather than imposing software or process terminology. The produced framework generates a process-driven, centralized taxonomy of information and resources as business requirements are captured. The framework delivers users an organization-specific context to activities and information to be used for learning, training, reference, improvisation, collaboration, and operations. Said system has application in disseminating policies, procedures and compliance; business continuity; improved productivity and culture; training and learning; increasing the return on existing and requirements gathering for future IT investments; employee attrition, retention, and onboarding; capturing and managing knowledge and intellectual capital; and continuous improvement and process reengineering.

24 Claims, 11 Drawing Sheets

OTHER PUBLICATIONS

Miers, D., "Put to the Test: Appian Enterprise 5 Masters Process Change, Liberating users from rigid models, Appian's Enterprise 5 BPM suite lets you alter the process to ease exception handling," IntelligentEnterprise [online], Jun. 2006 [retrieved on Jul. 27, 2006]. Retrieved from the Internet: <URL: http://www.intelligententerprise.com/showArticle.jhtml?articleID=188101079>, pp. 1-3.

"Appian Unveils Third-Generation AJAX-Based User Interface," AJAXWorld Magazine [online], [retrieved on Jul. 27, 2006]. Retrieved from the Internet: <URL: http://ajax.sys-con.com/read/191910_p.htm>, pp. 1-2.

"Process Management," Appian [online], [retrieved on Jul. 27, 2006]. Retrieved from the Internet: <URL: http://www.appian.com/AppianEnt/Process/process.html>, p. 1.

"Appian Enterprise: Process," Appian [online], [retrieved on Jul. 27, 2006]. Retrieved from the Internet: <URL: http://www.appian.com/screenshots/process5_screen.html>, p. 1.

* cited by examiner

FIG. 8

In Audit mode, system activity can be reviewed individually or in aggregate by:

- Process
- User
- Date range

FIG. 11

SOFTWARE SYSTEM FOR MANAGING INFORMATION IN CONTEXT

CROSS REFERENCE TO RELATED APPLICATIONS

This application is entitled to the benefit of Provisional Patent Application Ser. No. 60/609,845, filed Sep. 15, 2004.

BACKGROUND

1. Field of Invention

This invention relates to using software for improving productivity; specifically, using organizational business processes as a means to identify, organize, connect to and deliver information when and where it is precisely relevant and needed.

2. Description of Prior Art

Organizations of many different types share the challenge of making sense of vast amounts of information and making it available to their staff, customers, partners and other audiences. Many attempts have been made to address this issue—information management approaches include Web and network-based search technologies and content and document management systems that index information across the organization, and store information in structured repositories. While these approaches have merit, they can actually contribute to productivity loss as they increase the amount of information that workers must navigate and evaluate. Ultimately, these approaches do not succeed as they place the onus on the end user to discover a meaningful context to information as it relates to them, in their organization, in their job. Other technology approaches include automating processes and the information that flows along those processes—but these rarely scale to consider or incorporate other processes independent of the automated flow and do not consider other information types that are not intrinsically part of the information flow and that cannot be automated. These systems are often highly complex to learn, use and maintain. No existing approach explicitly and intentionally utilizes process logic to build a single enterprise framework that codifies information context and structure so that contextual interaction with that information can be delivered to the end user exactly when and where it is needed.

SUMMARY

The present invention is an enterprise software platform that uses the rigor of business process (a sequential decomposition of related or dependent activities or steps; future references to a process should also be understood to include activities and sub-activities) to capture and manage information in context—seamlessly integrating strategy, people, content, knowledge and infrastructure into a single common software framework.

Rather than depending on software experts and process consultants to assist in set up and ongoing support, the present invention requires input only from people who know their jobs, or are credible experts in their fields—subject matter experts (SME). Since the present invention was designed for ease of knowledge capture, a system user can, in a structured way, precisely extract process expertise from hands-on experts (who sometimes have the most useful tacit knowledge, but are perhaps lacking in communication and organizing skills) as well as domain experts who generally have a less granular but broader and more strategic perspective.

The present invention has broad impact on an organization, in areas such as but not limited to: policies, procedures and compliance; business continuity; improved productivity and culture; training and learning; increasing the value of infrastructure investments, and requirements gathering for future IT investments; employee attrition, retention and onboarding; capturing and managing knowledge and intellectual capital; and continuous improvement and process reengineering.

Objects and Advantages

A fundamental difference from other systems for managing information and business processes is that the present invention was created to address the fact that most organizational activities (80-90% by some estimates) require communication and collaboration—human interaction, reasoning, improvisation, judgment and decision-making. Most technological systems, however, ignore this aspect of the organization, instead focusing on the 10-20% that can be automated—thus controllable—by eliminating the human component. Automation's value is in the fact that it applies logic and rules, providing structure, consistency and repeatability. The present invention leverages automation principles (business process logic, business rules) but applies them toward codifying communication-centric and collaborative processes and activities, then providing a mechanism for connecting to and accessing the content and information. The present invention leverages process logic, or a systematic, common vocabulary for representing activities, sub-activities and their relationships and relevancy to information types, by these key means:

1. The present invention utilizes business process logic to capture, structure and standardize subject matter expertise, tasks and activities into a process taxonomy, or a hierarchical relationship of activities. Key to this innovation is that it is done in a highly usable way, unlike previous and existing approaches to capturing process information, so that anyone can use the innovation with little or no training. In doing so, the present invention approaches business process modeling in an entirely new and unique way.

2. The present invention utilizes business process logic to define and manage business objects, types or classes of information and resources that have different kinds of relationships with other information and resources (or objects) as well as attributes and instantiations (or examples, also known as assets). The business objects are ordered into a master taxonomy, or a hierarchical relationship. Key to this innovation is the reuse of the master taxonomy across many process taxonomies, dramatically reducing the redundancy of object instances, or assets. The business objects also have other kinds of relationships to each other, including but not limited to, space (here, there, anywhere), time (new goo), form (blue goo, gooey). These relationships enable clarity and communication of dependencies, impact and change throughout the process taxonomies.

3. The present invention uses the output or result of items 1 & 2 to deliver organization context (the combination of process information and business objects) whenever and however useful and relevant to users for the following purposes, among others, but not limited to, learning, training, reference, workflow and operations. Users literally navigate by processes, going activity by activity, and at each activity are given access to information and resources directly relevant to that specific activity. Delivery methods include, but are not limited to, Web browsers, personal digital assistants, cellular phones, email, word processors and spreadsheets. For this invention, Web browser should be understood to mean any device capable of communication with other devices via Transmission Control Protocol/Internet Protocol (TCP/IP) or similar protocols, wire-line or wireless.

The present invention provides a fluid and scalable framework for managing change, so as the ways people do things change, the software easily adapts—and is adapted—by the users themselves. The present invention can be configured and modified at different tiers, so processes and procedures can be scaled to adapt and conform to geographic variants (laws, terrain, weather, language, customs, culture, etc.) and still managed by the end users rather than software administrators.

While the previous elements are at the heart of the present invention, in the preferred embodiment, there are additional aspects that distinguish it from prior art. These include:

1. Ease of use in process modeling: Unconstrained by subject matter or functional bias (unlike most software systems that are driven by a specific business requirement), a key aspect of the present invention is in the creation of a business process modeling toolset that looks nothing like traditional toolsets, namely highly complex and confusing with painful learning curves. For example, in the present invention, the preferred structure for a process or activity is indicated by using red, yellow and green stoplight colors as visual cues for the user, and inheritances of business objects in relation to processes or activities are presented to aid in decision-making so that decisions are not made in a void. The toolset of the present invention was designed by interaction design and usability experts specifically for exceptionally high ease-of-use by the person who has the greatest knowledge about what they do (albeit generally in an ambiguous, tacit form)—the SME. The toolset helps gently and painlessly extract a rich, thorough "snapshot" of what people do, how they do it, and the precise information resources needed every single step of the way. Should the SME not desire to be hands-on, it can just as easily be done by interview. Unlike other approaches to knowledge capture, the benefit of process logic is that it extracts expertise in a highly structured way.

2. Adaptable to any business process: Because the present invention incorporates a platform that uses business process logic as a mechanism for capturing and communicating "how to," it is highly flexible and adaptable. Business processes are organic, and change and evolve frequently, driven by new ideas, innovations, policies, laws and regulations. This ease of change is at the heart of the present invention—unlike most hard coded software technologies. The present invention can be used to develop a set of "best" principles and practices that can be disseminated broadly, then customized at the departmental or regional levels, reflecting the unique operating environments of all the parts of an organization or entity. For example, resources and technology can be shared nationally, and resources exclusively useful at the local level can be added and only shared at the local level. The present invention adapts to and constrains information requirements for sub-audiences, sharing selective subsets of information and resources as required or desired.

3. Seamlessly integrates with other systems: The elegance—and Achilles heel—of most systems is that they are built to solve a specific, discrete problem (consider Voice over Internet Protocol (VOIP), email, Global Positioning Systems (GPS)). Precise vendor knowledge and expertise is aggressively applied, creating a rich and focused system. The flaw is that these highly focused solutions were not built (or imagined) to scale and include or incorporate not-directly related data, processes and semantics from other processes or functional areas. The present invention's capability for seamlessly integrating disparate systems was born from that frustration, that a significant portion of IT budgets go to software code-level integration and reintegration of new technology systems and upgrades because they were not built to be interoperable. This is a burdensome requirement for IT environments that must constantly adapt to new and useful technology. The present invention's breakthrough was enabled by the nature of processes it supports—communicative and collaborative processes. They do not require the deep data sharing code-level integration of automation. Communication and collaboration utilize associations and connections to communicate understanding and facilitate decision-making. The present invention delivers "when I am doing this, I need this system, this regulation, this form, and this person" in a single interface that requires little or no training to operate (FIG. 3).

4. Rapidly deployable subject matter expertise: Unlike most approaches to capturing expertise, processes and resources, which usually employ a rigorous review and requirements loop prior to implementation of a support system, SME input to the present invention instantly becomes output to system users via a Web browser, so knowledge captured from experts becomes immediately available to all users. Additionally, new examples or assets within the present invention are instantly available. Another benefit of knowledge capture, is the creation of a "shopping list" of required information and resources, which can be used for collection or creation.

DRAWING FIGURES

The invention will be described with respect to a drawing in several figures, of which:

FIG. 8 shows the context authoring screen of the preferred embodiment, in three stages.

FIG. 11 shows the audit manager screen of the preferred embodiment.

DESCRIPTION

Figure 1:
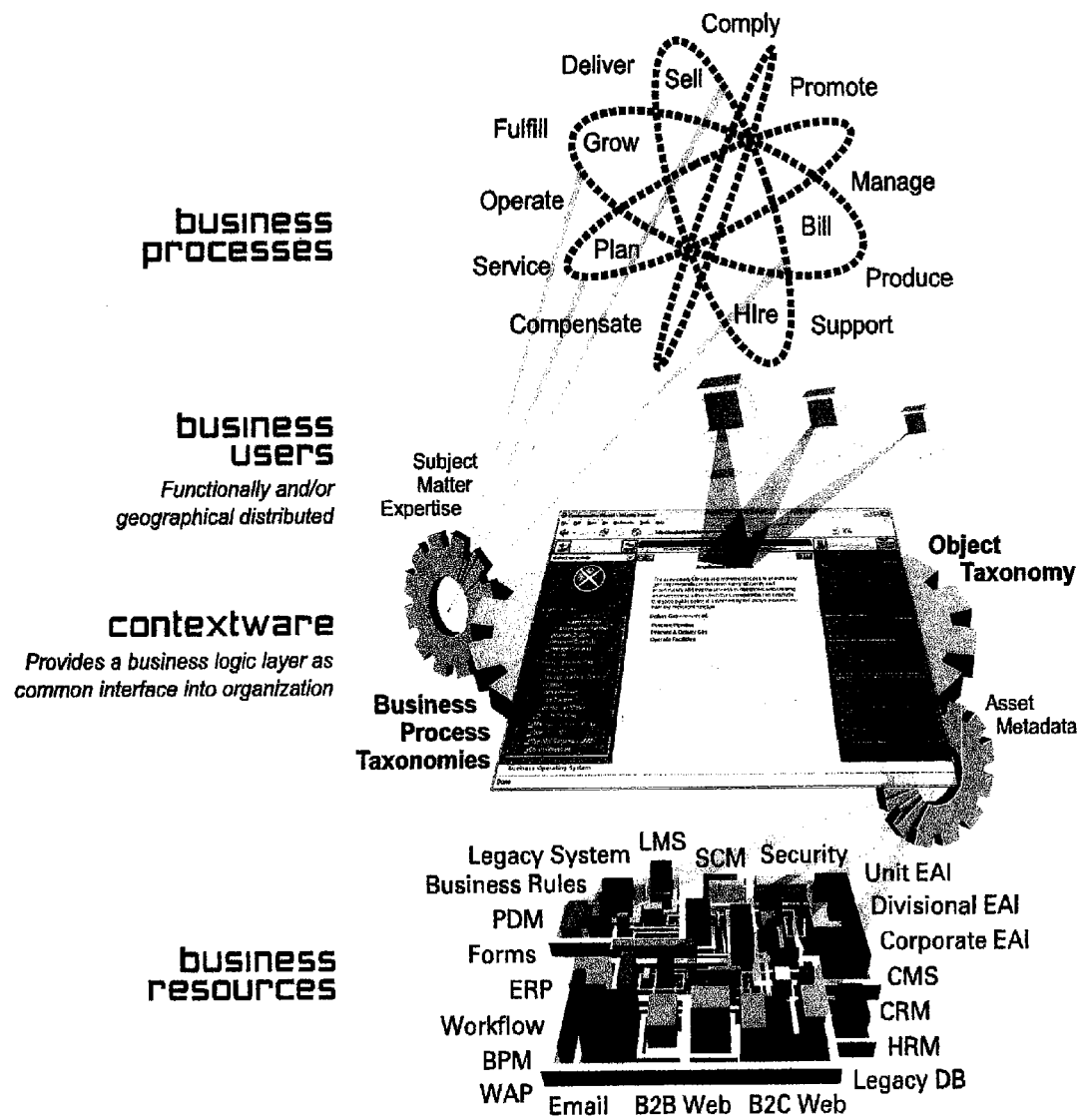
FIG. 1 shows the present invention's interconnection of process taxonomies with object taxonomies and that they are accessed by, created and delivered in, a common interface.

The critical innovation in the present invention comes from the convergence of two key technologies—automation (or business processes) and categorization (or information and content taxonomy management) into a common interface (FIG. 1). This innovation allows organizations to use business logic and rules as a framework for structuring content and related resources, then use business logic and rules for information retrieval, thus providing an organizational-specific context for users.

Thus, the present invention has two key components. First is the authoring toolset, which, using business process logic, captures SME knowledge and expertise in a rich and thorough manner. The captured expertise is structured into a process taxonomy (optimized by converging the expertise of many into one single "best practice"), which in turn defines the precise information and resources needed. The information and resource taxonomy then connects to actual instances of those resources, no matter where they are—internet/Web, Local Area Network (LAN), Wide Area Network (WAN), offline or elsewhere.

The second key component is delivery of expertise, process and resources via Extensible Markup Language (XML) in the preferred embodiment. Delivery can be customized for everything from email, Personal Digital Assistants (PDA) and cell phone to cash registers and Point of Service (POS) kiosks, and enables users to operate in real time around mission critical information, resources and applications. As they interact with the system, user actions are tracked and aggregated, providing keen insight into areas of high value, and areas in need of improvement and refinement.

The present invention is built on open standards, not just in the software code (in the preferred embodiment J2EE, XML/XSLT, JSP, SQL), but in the kernel, the engine that drives the platform, as well. In the preferred embodiment, it is based on the Integrated Definition (IDEF) business process language, and it is the only process language that is a Federal Information Processing Standard (FIPS). Since, in the preferred embodiment, the process output is XML, it is highly flexible in how that data can be shared with other systems.

Figure 2:
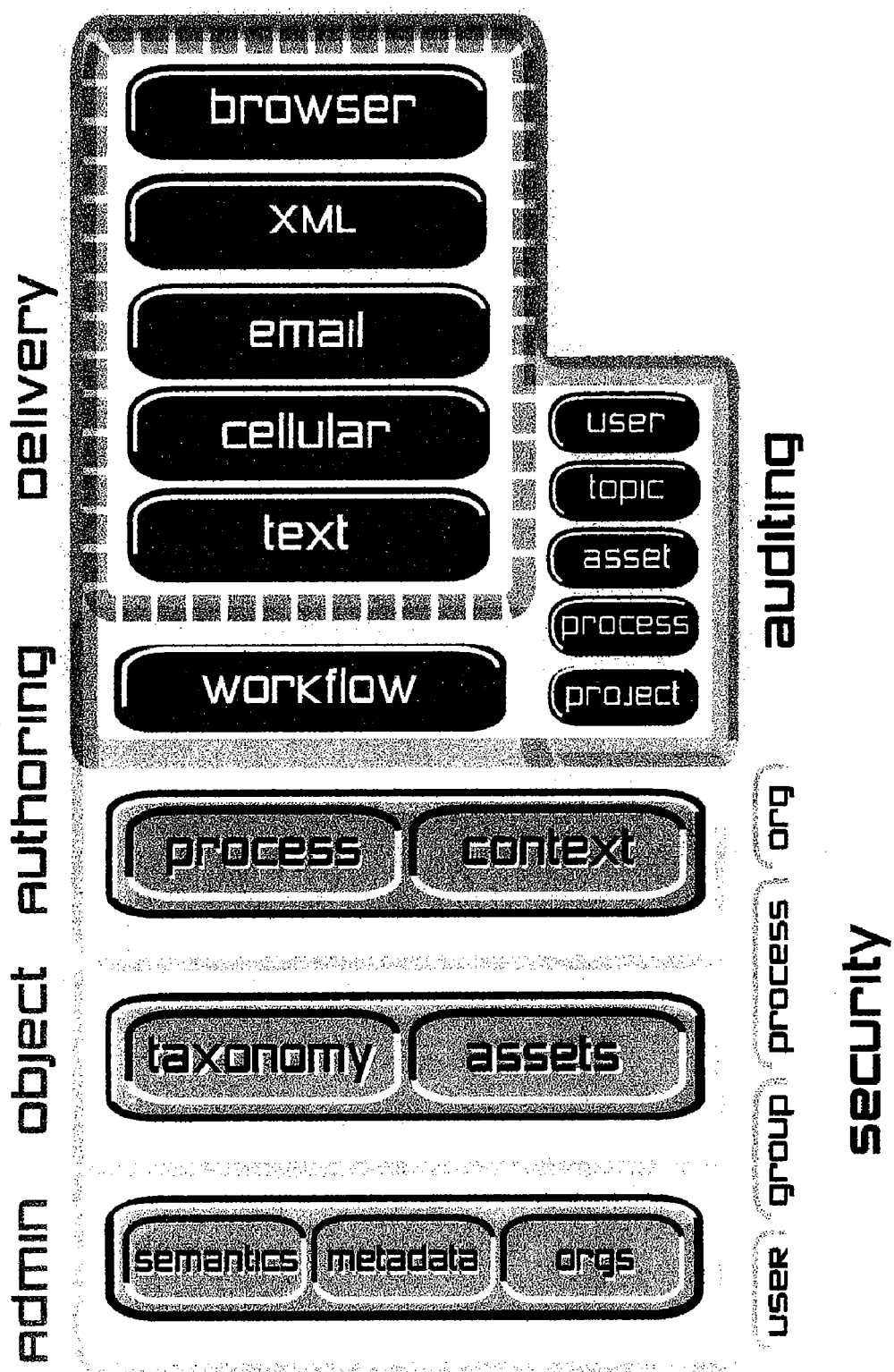
FIG. 2 shows the architecture of the preferred embodiment.

In the preferred embodiment, the present invention is a scalable, Web-native, J2EE-compliant platform (FIG. 2) designed to capture, organize, distribute and enable operations around business activities and information.

The present invention provides a unique, flexible approach to managing information. The system-wide object taxonomy is dynamic, so it can be easily modified and updated. It only references asset metadata—allowing for seamless changes and upgrades of systems and resources. The system-wide object taxonomy is re-used across many processes, so that redundancy of asset instances is nonexistent.

Context Retrieval

Figure 3:
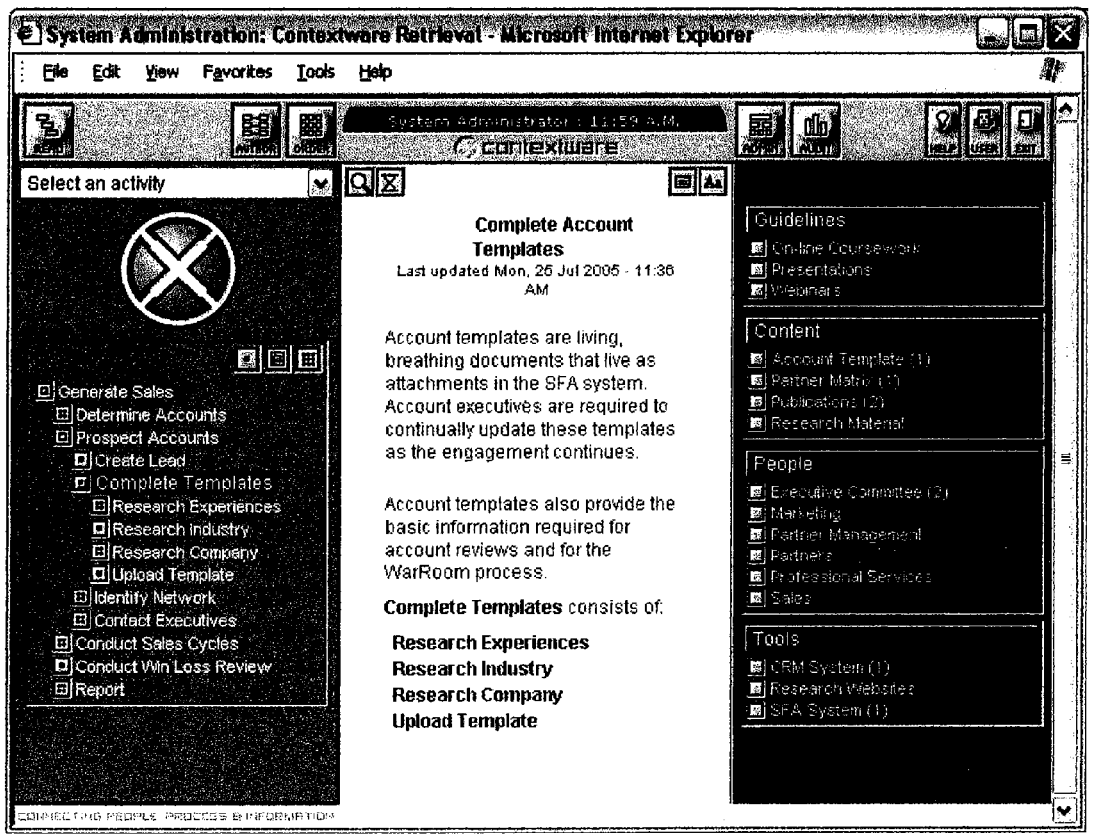
FIG. 3 shows a desktop Web browser information retrieval screen of the preferred embodiment along with corresponding flow diagram.
Figure 3:
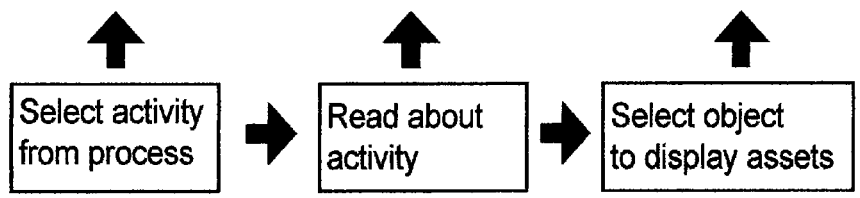

Contextual retrieval of information in the present invention includes, but is not limited to, a simple three-panel layout (FIG. 3). In the preferred embodiment, the features are organized in a simple manner as described below, but this invention includes the possibility of other layouts as well. On the left, users select a process then navigate through the process, one activity at a time. When an activity is selected, the middle panel displays a narrative or description of the selected activity. On the right are business objects clustered by role or relevance to the activity. In the preferred embodiment, there are six roles; inputs, or things that drive or initiate the activity; guidelines, or things that constrain or regulate the activity; content, or information-rich things that are utilized, like templates, documents and media; tools, things like hardware and software that are used performing the activity; people who are involved in performing the activity; and outputs, or the expected results or outcome of the activity. Selecting a business object from the right resets the middle panel to display a list of assets that are representative of the object. Displayed with the assets is object-defined metadata, including but not limited to title, author, image, description, owner and location. Users select an asset to access it. The literal intent of this function is to ensure users are always exactly two clicks from the precise information and resources they need to perform the currently selected activity. The first click makes the user select an object, or type of resource (and forces them to consider the relevance and relationship to the current activity), and the second click delivers the example or asset associated with the resource itself.

Figure 4:
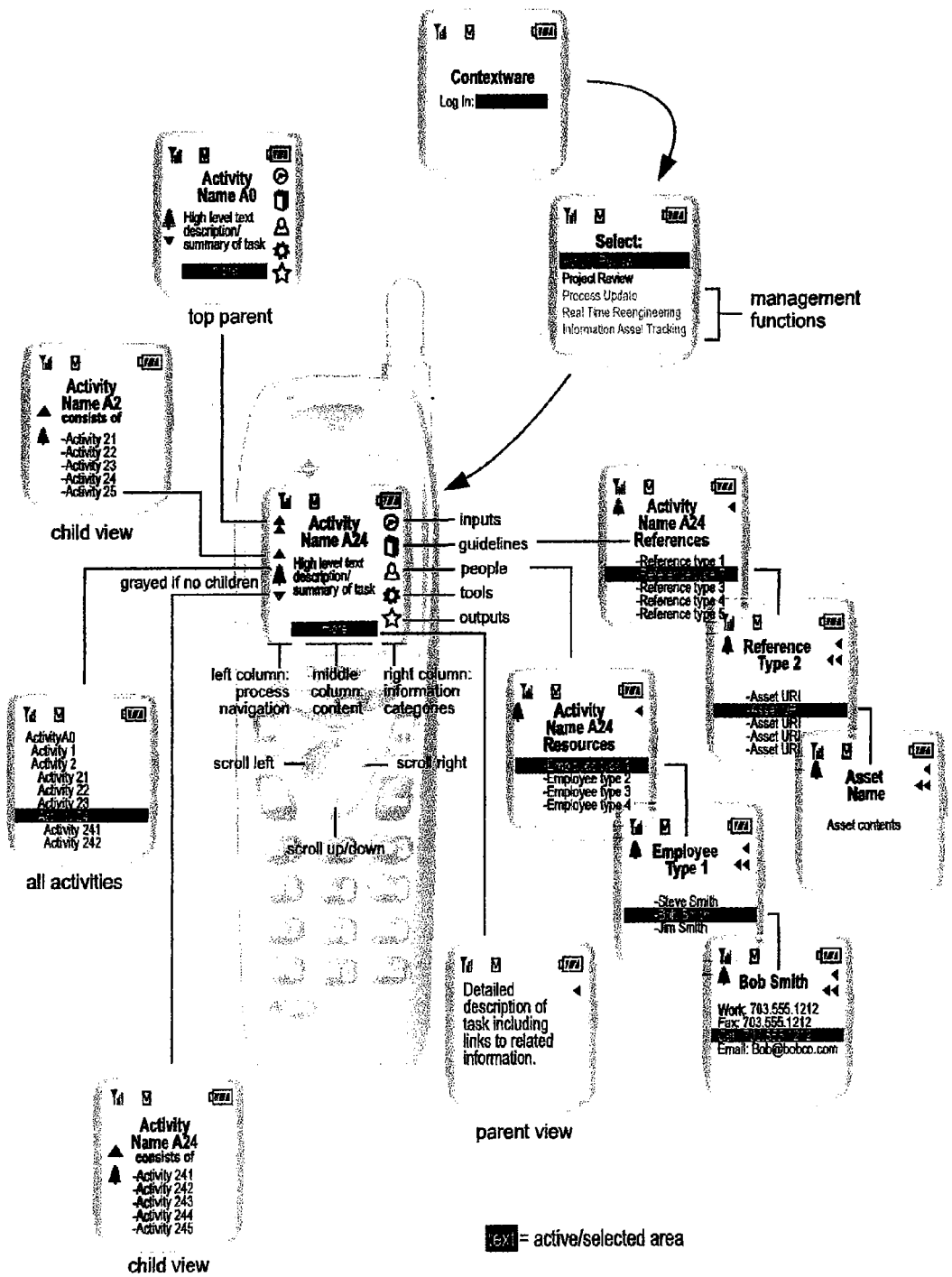
FIG. 4 shows a mobile Web browser information retrieval screen of the preferred embodiment.

Context retrieval delivers process and business object taxonomies via various modalities, including, but not limited to, internet browser (FIG. 3), a PDA, a cellular phone (FIG. 4), gaming interfaces and digital appliances.

Context retrieval includes, but is not limited to, the following modes: Learn mode for training and testing around process and object information and data; Read mode, which displays process and object information and data for access and retrieval; and Work mode, which is an instantiation of process and object information and data into an active workflow that supports specific project and team engagements. Users can toggle between the different modes so they can extract meaning from the process and object information and resources in the way that is most useful to them at that point in time.

Learn Mode: This is the full view of each process and relevant objects. Everything is exposed, and users may or may not be forced to click through them all. This function provides testing at each process level, enforcing access of each object and asset. Once each element has been accessed/tested, the next activity node becomes available. Testing can also be applied before the next node is activated.

Read Mode: This provides access to process and object information for reference and retrieval. This is more streamlined that the Learn mode, as users should be able to find exactly what they need when they need it. Visually clutter is minimized, and the user is able to easily configure preferences, including functions and layout.

Work Mode: This allows for referential processes to be instantiated so that users can follow them step by step as they do their jobs. Upon each step's completion relevant process members are notified, by methods including but not limited to, email and text message. Assets are no longer "examples," but specifically relevant to the instantiation. Managers can monitor project status and receive notification when deadlines are missed and projects completed.

Context retrieval sub functions common to some or all modes include:

Frequent Activities: Ability to designate and shortcut to frequently accessed activities, objects and information.

Interaction and Collaboration: Capability to send to others user-customized information and linkages to specific processes and objects via devices including, but not limited to, email, text messaging, bulletin boards, threads, blogs, wikis and whiteboards.

All Text: Alternate representation of process object information and data that satisfies the standards set by Section 508 (29 U.S.C. 794d).

Process Search: Utilizes natural language, by incorporating synonyms and related terms, or a taxonomy, such as WordNet, to do a fuzzy match (best available choice with related terms permitted) on the process terms, to search process and object information and resources for similar concepts. Search can be filtered by object characteristics (for example, search for processes that only include an employee object and a certain keyword type). Search results can be refined by their semantic relationships to other activities and objects (i.e., these are a kind of this, this is a kind of this, show me more like this). Search can be constrained by range as well (e.g., only provide results when these search terms occur within 100 words/the same sentence/same paragraph).

Process Media: A graphical representation of processes and objects utilizing existing media types (images, motion) to represent keywords and concepts captured into processes and objects. For example, a process named "Bake Cake" provides the user an option to pull related images of cakes from an online archive to display.

Context Authoring

The underlying logic that drives context authoring is derived from a business process language that provides a system view of the organization. The benefit of a system view is that it not only identifies types of information and data, but dependencies and impacts between process activities as well. In the preferred embodiment, this language is IDEF, a language developed by the United States Air Force, or IDEF-like, as explained below.

The present invention has evolved the IDEF language substantially, as in its traditional form it is represented by a four-sided box, thus is constrained to four dimensions of information. The present invention has expanded that to a core set of six, but is configurable to an unlimited number and is unconstrained by graphical boundaries. The present invention has also greatly simplified the IDEF language so that training and expertise is no longer required to be able to apply IDEF principles and logic.

Figure 5:
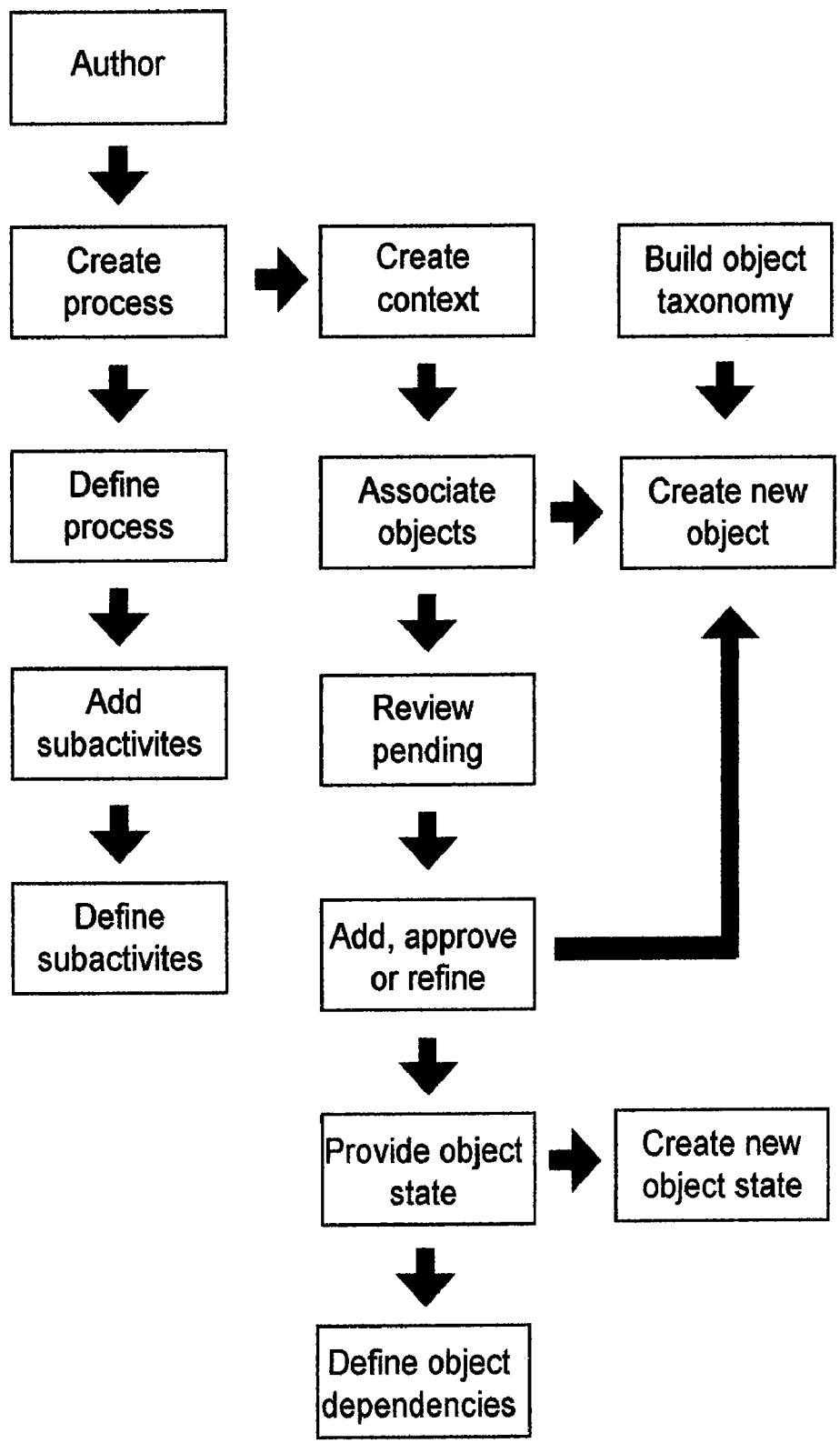
FIG. 5 shows the flow of the authoring process of the preferred embodiment.
Figure 6:
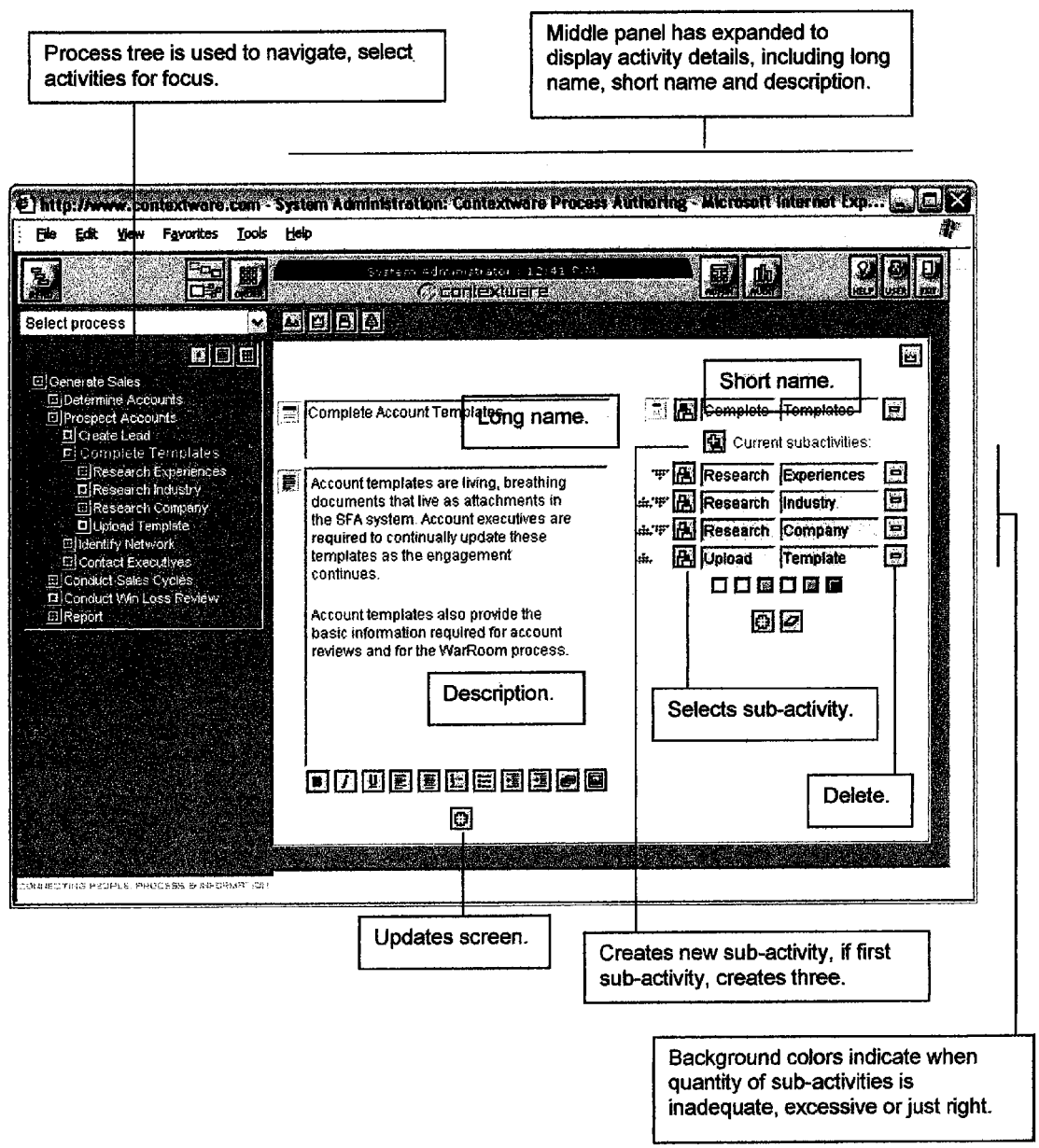
FIG. 6 shows the process authoring screen of the preferred embodiment.
Figure 8:
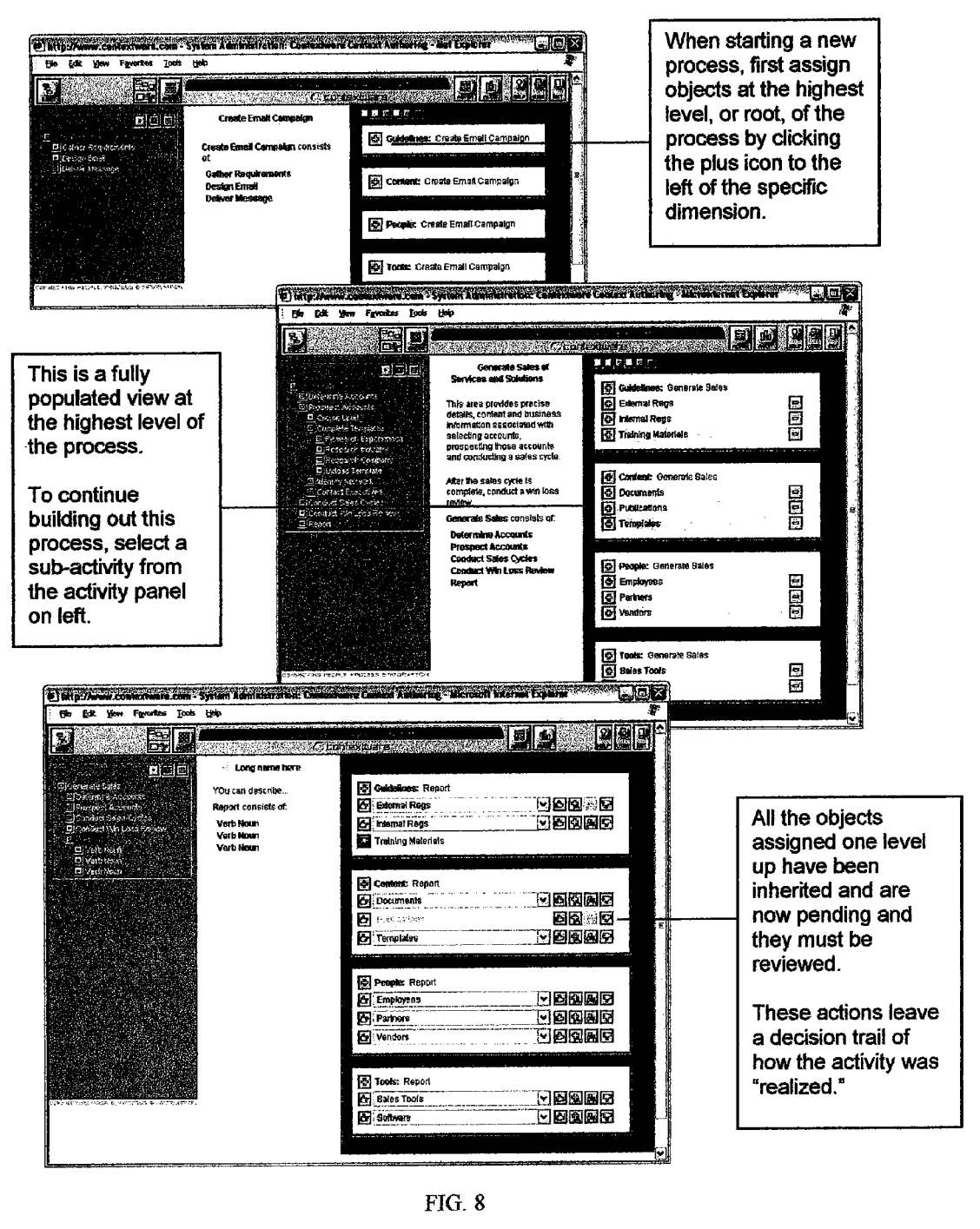

In the preferred embodiment, context authoring is reduced to two primary functions (FIG. 5). The user first creates a new process in the Activity Manager (FIG. 6), then is encouraged to decompose the process into greater and greater detail and precision, creating sub-activities and sub-sub-activities. Each sub-activity can be described in detail via customizable metadata (including, but not limited to, description, name, definition, creator, scope, point-of-view, owner). Then, in the Context Manager (FIG. 8), the user associates objects that represent information types that are precisely relevant to the sub-activities. The user starts at the root, or top, of the process and adds high-level objects. The user then goes to the sub-activities, as they have inherited the assigned parent objects and now are in a pending state. The user reviews the pending objects (the assumption is objects relevant to the parent are most likely relevant to the child, either as is, or in a more granular form), and either rejects them, approves them or refines one or more of them. These approved objects then inherit to the sub-activities of the current sub-activity, and so on.

Context authoring utilizes many devices and techniques to simplify the user experience—while the underlying logic enforces hard rules, interface components "suggest" and "prompt" soft rules. These include a graphical view, in which limitations on process are incorporated into the user interface, using techniques including, but not limited to, color; shape; semantics, including use of verb-noun syntax; limiting or including recommendations limiting the number of steps; or prompts to reuse existing business objects, or differentiate them explicitly from new ones; graphical or textual recommendations or prompts. Graphical icons are used to capture repeating functionality into a logical set, so that the user can concentrate on the business text, for example, icons showing first name, middle name, and last name by darkening the corresponding first, middle, and last sections.

Recommendations are provided to a user graphically using software, by providing both hard rules (requirements); and soft rules (suggestions), including such techniques as the following; alt-tags or title tags to provide help suggestions, tutorials, or prompts, when graphical icons are "moused over" or otherwise summoned; limiting field names to nouns, process names to verbs; color, shape, quantity, length, and other factors that can all be enforced by the user interface (e.g. rules for writing a certain type of business document: if the user writes a section that is too long, it turns yellow; if advertising copy exceeds the "Standard Advertising Unit" of 2¹/₁₆" in width, the copy turns yellow).

For terminology management, if a term previously used in the document is mis-capitalized, it turns red, e.g. if the user tries to write Teacher preparation packet instead of Teacher Preparation Packet. If a term is used that is related to one in the corporate glossary or the semantic net, it turns yellow, so that, for example, the user knows to check if Intelligent Information Systems Division should have been changed to Intelligent Information Systems Unit.

Context authoring sub functions include:

Activity Suggest: Utilizes natural language semantic expansion to suggest alternative, logical verb/noun combinations for process and process activity labels.

Process/Activity owner: Provides history around who created and updated a process and when it was created and updated.

Author Note: User input, comments and feedback regarding authorship of the specific process/activity.

Process/Activity Metric: Allows the user to set time reference regarding a process. In the retrieval function, it is a reference point in "learn" and "read" modes, but it triggers alerts and notifications in "work" mode.

Process Security: Manages group/user access levels for the process.

Figure 7:
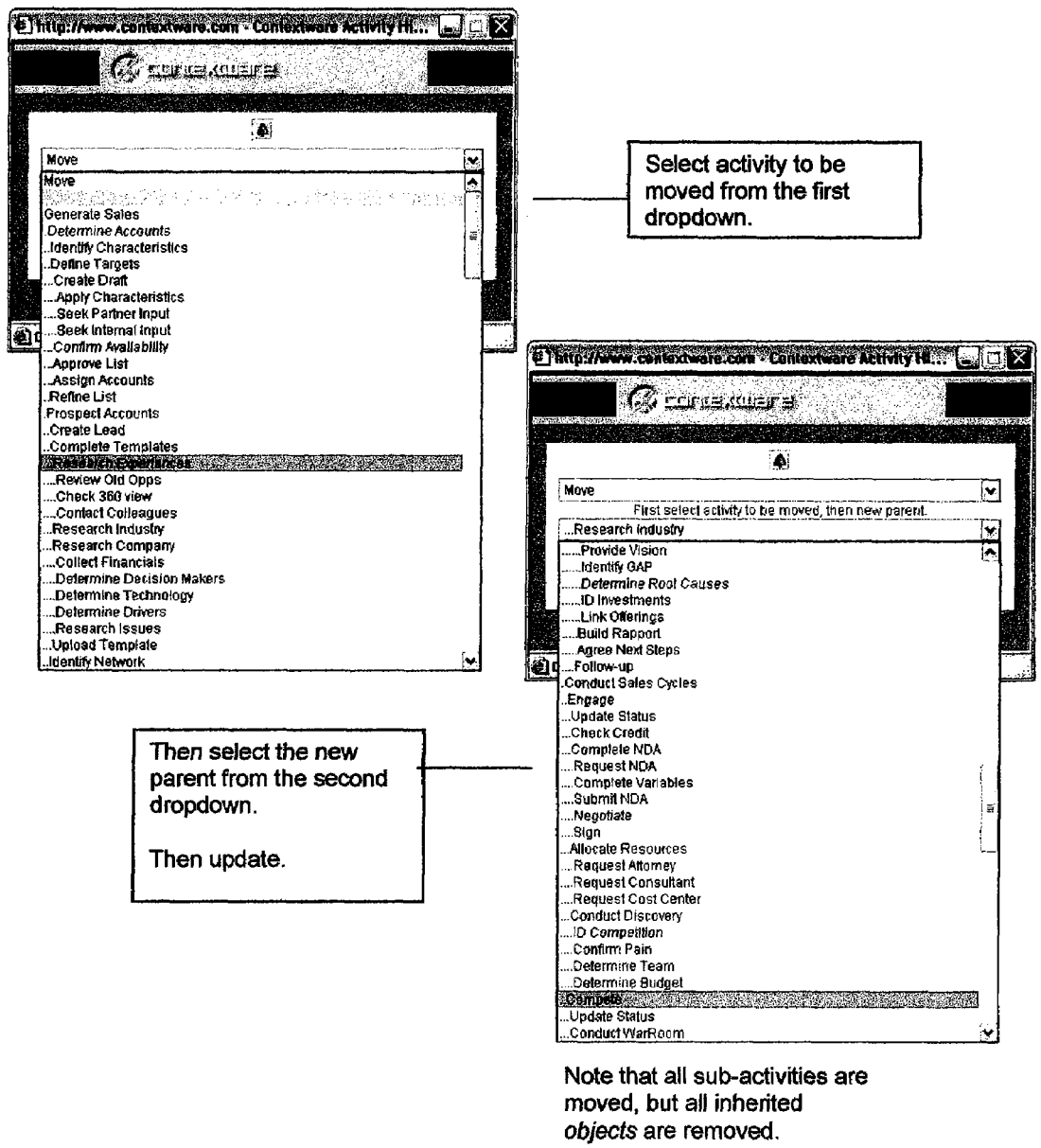
FIG. 7 shows the process hierarchy management screen of the preferred embodiment.

Activity Hierarchy Manager (FIG. 7): Allows reorganization of a single process hierarchy and enforces process language logic in doing so. This is a key function for managing process structure, and, in the preferred embodiment, includes the following rules:

1. When an activity is moved, all its sub-activities (and their sub-activities), if any, should move with it.

2. When an activity is moved, all inherited objects and their sub-activities should be removed from the activity and all its sub-activities.

3. When an activity is moved, all objects directly added should remain and should still inherit to any sub-activities (and any objects added to the sub-activities should remain/inherit as well).

4. When an activity is moved, it should inherit all approved objects from its new activity in pending mode.

5. When an activity is moved, it should be placed as the last sequenced activity of all activities previously displayed.

6. If a user tries to move an activity to the same/current parent, an alert states, "This activity is already a sub-activity of the root you selected."

7. If a user tries to move an activity to be a sub-activity of itself, an alert states, "Cannot make an activity a sub-activity of itself."

8. Any root activity in a given hierarchical branch cannot be made equal or less than any of its sub-activities; when this is attempted, an alert states, "Cannot make an activity a sub-activity of itself."

9. Other than rules 6-8, an activity can be moved anywhere.

Process Hierarchy Manager: Allows for the merger of multiple process hierarchies and enforces process logic in doing so. This includes the same rules as for the Activity Hierarchy Manager, but also allows for merging objects from the moved process with similar or like objects from the new root process.

Send To: In the Context Manager, the user can send objects from one activity where they occur as output to another activity where they become an input or guideline.

Object Removal Impact Assessment: Assessment of impact on the process when objects are removed.

Process Validator: Reports on validity and quality of process once completed; makes recommendations for areas for improvement.

Process Copy: Makes a copy of process structure but reuses source process system objects and assets.

Process Instantiation: Creates a copy of a process that references a source process but allows for unique users and assets (this is utilized in Work, or project mode). Changes to the source process occur in the instantiations as well.

Process Snapshot: Captures a process and all associated information (usage, objects, assets) for archiving and copying. A restore function merges processes, objects and assets back into the system.

Object Taxonomy Management

Figure 9:
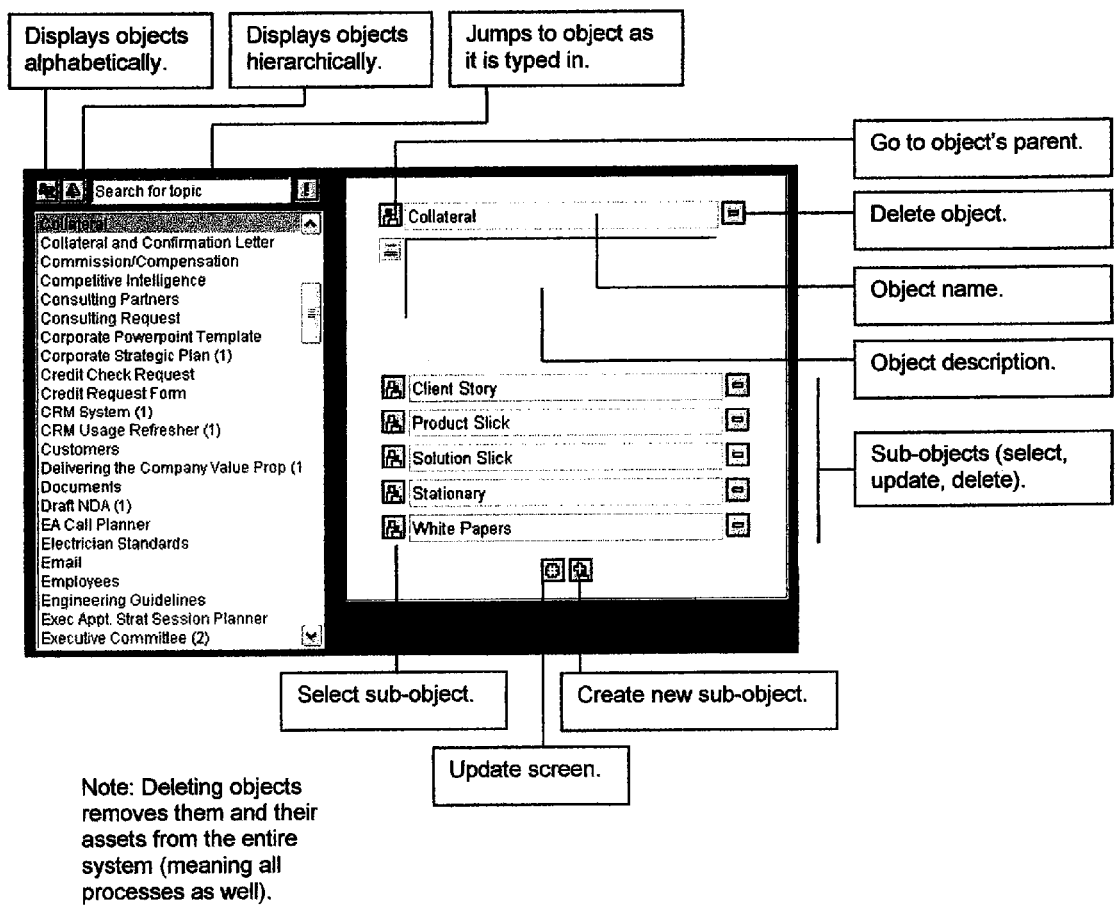
FIG. 9 shows the taxonomy manager screen of the preferred embodiment.

The taxonomy manager function (FIG. 9) allows users to easily build, manage and manipulate the object hierarchy. Users can create new objects, define them, and place them in their proper order within the taxonomy. The present invention's ease of use, which contrasts with other taxonomy tools, is enabled by the business process taxonomies as they define and drive the creation of the object taxonomy. Thus, objects in the taxonomy are highly relevant to the processes being performed. Most information taxonomies are built using pre-defined taxonomical constructs (e.g. Library of Congress Classification, by department or silo, or from the information and content "up," blurring the relevance to tasks performed by the enterprise. Key concepts as they relate to the object taxonomy include:

Association: a defined relationship between an object and an activity.

Creation: objects can be created as root objects, or as subtypes of other objects. An object consists of a name and a definition. Objects are ordered alphabetically.

Modification: object name and definition can be updated. This does not affect any activities they are associated with.

Deletion: objects can be deleted from the system, and in doing so removed from all activities they are associated with.

Figure 10:
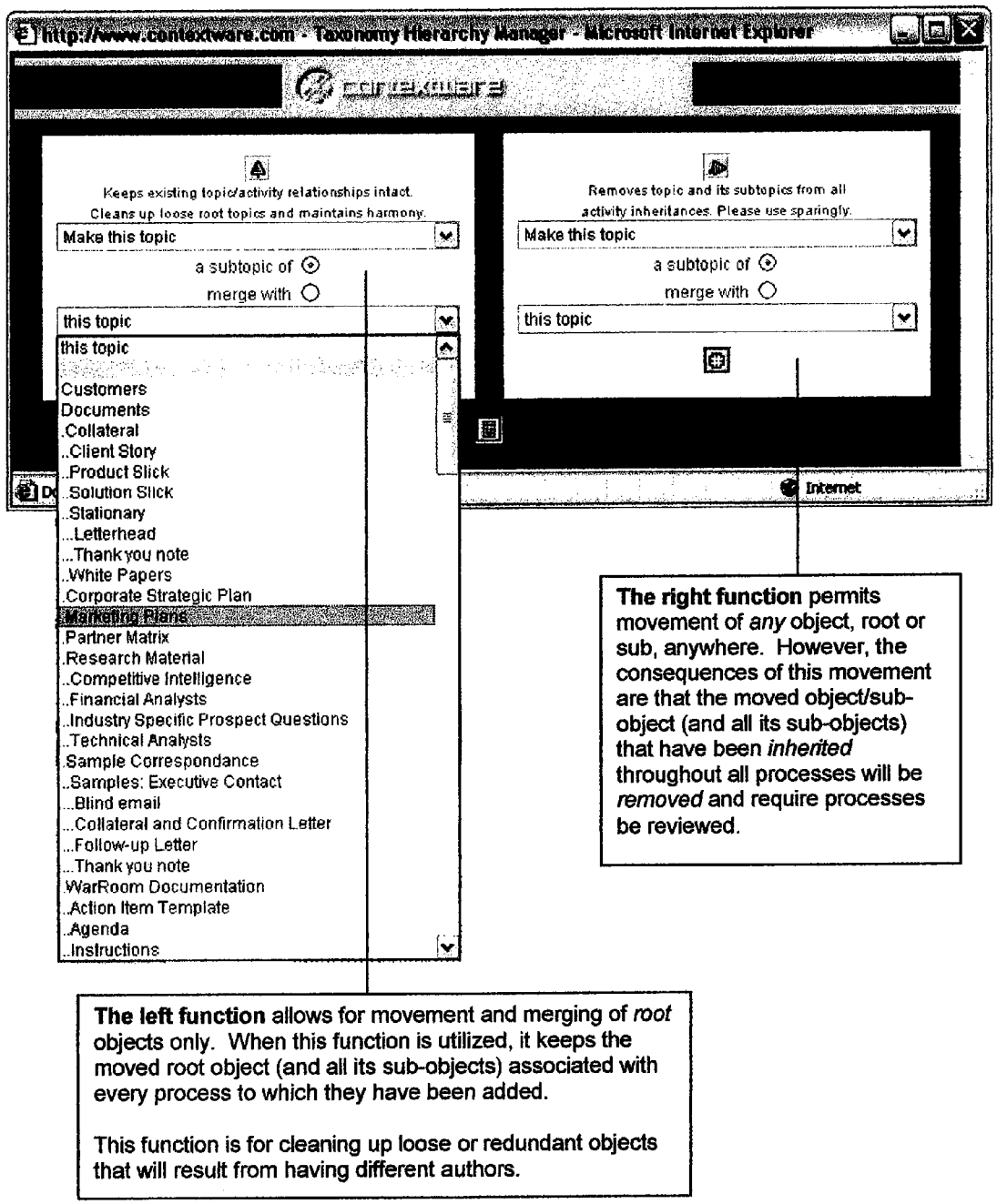
FIG. 10 shows the taxonomy hierarchy manager screen of the preferred embodiment.

A key function is the ability to manipulate the taxonomy using the Object Hierarchy Manager (FIG. 10). There are two ways of doing this: the first maintains object relationships and the second, out of necessity, breaks them.

1. When a root object is moved to become a subtypes of, or merged with another object:

a. All of the root object's subtypes move with it and become sub-subtypes of the new root object or subtypes of the merger (this impacts objects that have been added/approved but have no coordinate objects, having siblings will change the approved icon to approved sub-types).

b. The moved/merged root object stays associated with all processes to which it has been added (inherent in being a root object, it cannot be inherited).

c. The moved/merged root object's subtypes stay associated to all processes/activities they have been inherited to, including all actions performed (approve, reject, refine).

2. When a subtypes is moved to or merged with a new root object (including the root):

a. It is removed from any activities where it was inherited via the old root object.

b. It remains in all activities where it was directly added.

Object Asset Management

Unlike other systems for managing information and content types, the present invention assumes a resource, or asset, can be anything and exist anywhere. Thus metadata is used for not only description, but physical or virtual location well. Assets are instantiations, or examples of an object (the object identified as a proposal could have one or more assets like newproposal.txt, proposal.com, or proposal application).

Business objects and their assets may be used to connect various aspects of an organization's existing or future technology infrastructure (including, but not limited to, links to advertisements, business objects, libraries, and software), e.g. the object called Customers can point to a sales forces automation tool.

Interaction and collaboration may be performed using business objects including, but not limited to, advertisements, audio, video, images, text, forms, links to objects, software, links to software, links on the Web, links on a network, and physical objects. Interaction and collaboration may include, but are not limited to:

a. Training
b. Learning
c. Project management
d. Compliance
e. Customer service
f. Monitoring
g. Search and retrieval The present invention provides security, or control over access to information down to the asset level. These include, but are not limited to, how an asset is represented (launched by itself; replaces current window; if process is an asset, resets screen) who can access the asset and update it, and who is alerted when an expiration date is soon to be reached or is reached.

Asset permissions can utilize asset metadata to synchronize with system information, for example, an asset can have a "zip code" characteristic (like 22042, or 75284), which would leverage the user profile "zip code" attribute to only display to the user assets that match his or her home zip code. Asset metadata can also be cross-referenced with other asset metadata, for example, so that a text message could be linked to a cellular telephone number.

Auditing and Tracking

Figure 11:
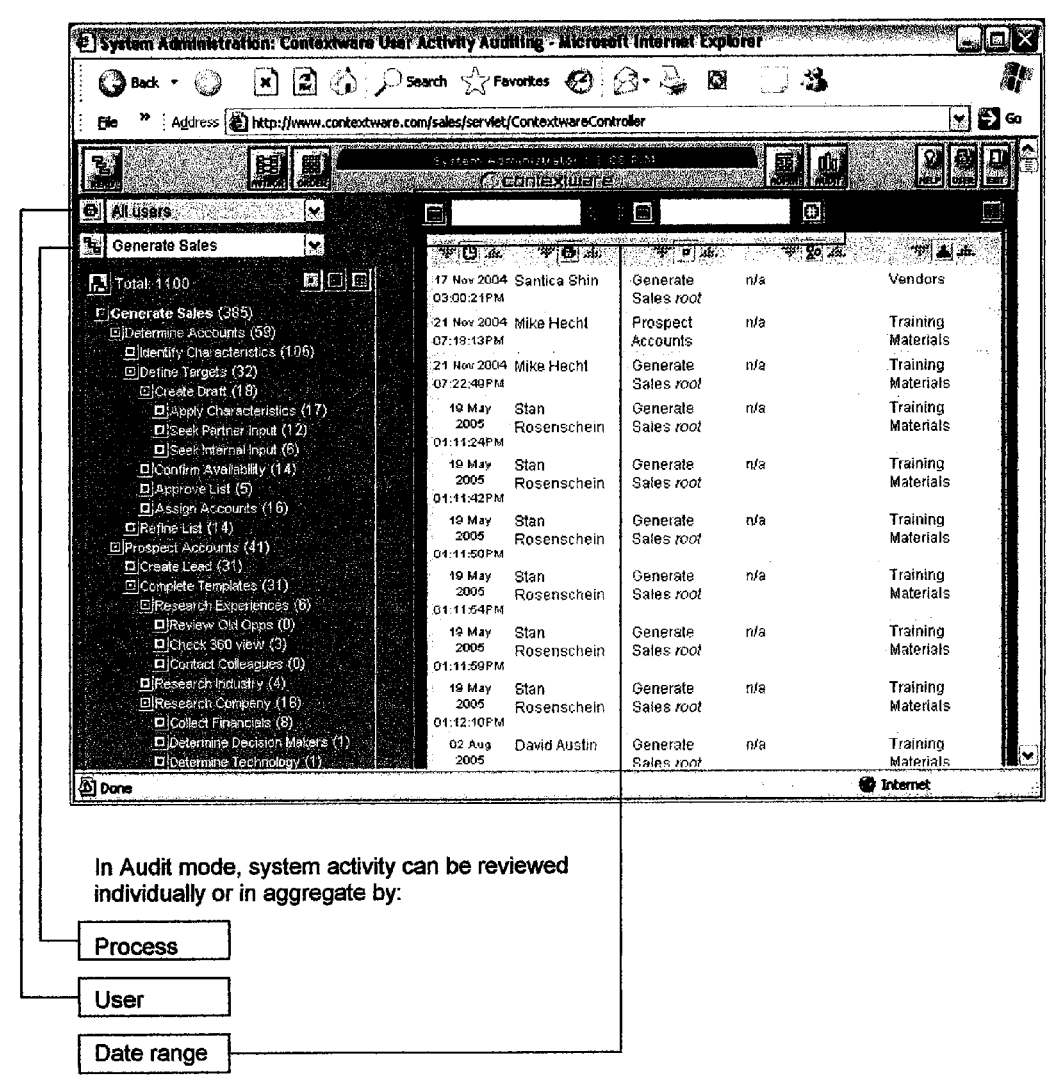

The present invention records all user activity within the system in real time. The reporting interface (FIG. 11) allows users to filter data by variables including, but not limited to, users, individually or in aggregate; processes, individually or in aggregate; date range. This function can provide a digital audit trail for compliance purposes, as well as provide explicit and implicit insight into the value and usefulness of organization processes so they can be improved and reengineered in real time.

Presentation and Interpretation of Information

By design, the present invention strives to maximize usability whenever possible, not only in authoring and management of the system, but in day-to-day usage as well. One way this is addressed is by making all textual aspects re-definable, certainly for foreign language versions, but perhaps just as importantly, for semantic alignment with the unique combination of functional and subject matter expertise that define an organization. When a system "sounds" like the organization, it is more likely to be adopted.

Correspondingly, when a system looks like the organization, adoption increases as well. Thus, the present invention is quickly modified visually, changing colors to layouts.

The present invention also allows for configuration around presentation of information, so that too much or too little can be controlled based on the business requirements. For example, if the present invention is utilized for communicating policies, two of the roles, inputs and outputs can be suppressed so they are not a distraction to the user.

CONCLUSIONS, RAMIFICATIONS AND SCOPE

The present invention is a unique hybrid platform that converges many technologies and approaches, including business process modeling and thought, taxonomical and ontological techniques and methodologies, business object mapping, semantics and metadata definition.

The present invention addresses the challenge of making sense of an organization's information and making it available to its various constituencies. It is an enterprise technology platform that uses the rigor of business process to manage information in context, seamlessly integrating strategy, people, content, knowledge and infrastructure into a single common software framework. It leverages automation principles (business process logic, business rules), applying them toward codifying processes and activities that depend on communication and collaboration.

The present invention leverages process logic, or a systematic, common vocabulary for representing activities, information, and their relationships, by these key means:

1. It uses business process logic to capture, structure and standardize subject matter expertise, tasks and activities into a process taxonomy, in a highly usable way.

2. It uses business objects, ordered into a master taxonomy, or hierarchical relationship, that are associated with real world instances, or assets.

3. Connected, these means deliver organizational context (the intersection of process information and objects), whenever and however useful and relevant to users, providing better access to information and, ultimately, enhancing productivity.

We claim:

1. A computer-based method associated with business process logic configured to capture, structure and standardize subject matter expertise, tasks and activities into a process taxonomy, the method comprising:

defining a first taxonomy of a plurality of nodes that define relationships among a plurality of activities and sub-activities;

defining a second taxonomy of a plurality of nodes that define relationships among a plurality of business objects;

defining a relationship between at least one of the plurality of business objects from the second taxonomy and at least one of the plurality of activities and sub-activities from the first taxonomy, the relationship being defined such that at least a portion of the at least one of the plurality of business objects can be accessed via the at least one of the plurality of activities and sub-activities based on the relationship;

defining a business process by manipulating at least one of the activities and sub-activities from the first taxonomy and at least one business object from the second taxonomy; and displaying on a graphical user interface the defined business process based on the manipulating the at least one of the activities and sub-activities from the first taxonomy and the at least one business object from the second taxonomy.

2. The method of claim 1 wherein the second taxonomy is used to categorize specific instances of business objects, the method further comprising:

describing a plurality of attributes associated with a business object, the attributes including at least one of location, name, definition, format, and author; and updating other instances of the same business object whenever the business object is updated.

3. The method of claim 1 wherein the first taxonomy relates to a first activity or sub-activity and a second activity or sub-activity, the method further comprising:

associating a business object from the second taxonomy with the first activity or sub-activity;

associating the same business object with the second activity or sub-activity;

displaying the business object separately as being associated with the first activity or sub-activity and the second activity or sub-activity, but still being managed as a single business object; and modifying attributes associated with the business object simultaneously across the first activity or sub-activity and the second activity or sub-activity.

4. The method of claim 1 wherein recommendations are provided to a user textually and graphically, the method further comprising:

providing hard rules;

providing soft rules, including at least one of alt-tags or title tags to provide help suggestions, tutorials, or prompts; and limiting input field names configured to receive data associated with the plurality of business objects to at least one of nouns, process names, verbs, color, shape, quantity, and length.

5. The method of claim 1 further comprising:

selecting a business object from the second taxonomy;

associating the business object with a node of an activity or sub-activity from the first taxonomy; and automatically associating the business object with sub-activities or sub-sub-activities of the activity or sub-activity.

6. The method of claim 1 further comprising:

automatically determining whether metadata associated with different business objects is in common; and removing or merging duplicate business objects and linking similar business objects based on the determining.

7. The method of claim 1 further comprising:

selecting a first node from the first taxonomy to be moved;

selecting a second node as a new root for the first node;

eliminating inherited attributes from the first node that were derived from its previous root(s);

inheriting attributes from the second node; and preserving attributes that were associated with the first node that the first node passed on to its sub-nodes.

8. A computer-based method associated with business process logic configured to capture, structure and standardize subject matter expertise, tasks and activities into a process taxonomy, the method comprising:

providing a graphical user interface to display a process taxonomy, the process taxonomy defined by process logic;

selecting at least one business object from a business object taxonomy, the business object constrained by the process taxonomy based on how information associated with the business object is precisely relevant to an associated business process;

retrieving metadata referenced by the selected business object;

defining a business process associated with the process taxonomy by performing at least one of the following actions:

providing feedback on the process taxonomy;

adding to the business object taxonomy; and performing an action on the metadata; and automatically displaying a visual representation of the defined business process without substantial user interaction, the business process defined by at least one of the providing, the adding and the performing.

9. The method of claim 8 wherein natural language is used as a mechanism for searching and navigating the process taxonomy and business objects by incorporating synonyms and related terms to perform a fuzzy match on the process terms.

10. The method of claim 8 wherein software is used for monitoring individual, group and organization effectiveness, by capturing information on who performs what processes, and on what business objects are utilized.

11. The method of claim 1, further comprising:
imposing limitations on the second taxonomy when defining the business process; and
displaying the defined business process on the graphical user interface, manipulation of the second taxonomy being restricted by the limitations imposed.

12. A computer-based method using business process logic to capture, structure and standardize subject matter expertise, processes, tasks and activities into a business process model, the method comprising:
providing a graphical user interface via a web browser, including a plurality of objects, the objects being associated with activities and sub-activities;
defining a business process via the web browser based on the objects by:
updating the graphical user interface in response to a manipulation of at least one object from the plurality of objects, the updating being performed via the web browser; and
limiting the manipulation of the at least one object based on a set of predetermined criteria; and
displaying the defined business process via the web browser, the defined business process based on the updating and the limiting.

13. The method of claim 12, wherein the set of predetermined criteria includes limits based on a process standard.

14. The method of claim 12, wherein the set of predetermined criteria includes limits based on an IDEF standard.

15. The method of claim 12, wherein at least one of the providing, the updating or the limiting is implemented using Java technology.

16. The method of claim 12, further comprising tracking the manipulation of the at least one object.

17. The method of claim 12, wherein the web browser is accessed via at least one of a local area network (LAN), a wide area network (WAN), a cellular telephone, a personal digital assistant (PDA), or another remote device.

18. The method of claim 12, wherein during the manipulation of the at least one object, a user is prompted with suggested names for the at least one object after entry of one character of an object name.

19. The method of claim 12, wherein the manipulation of the at least one object is based on unique information associated with the at least one object.

20. The method of claim 12, further comprising providing an object manager application configured to allow editing, creation, and deletion of available objects for manipulation purposes.

21. The method of claim 1, wherein the graphical user interface is provided via a web browser.

22. A computer-based method using business process logic to capture, structure and standardize subject matter expertise, processes, tasks and activities into a business process model, the method comprising:
defining a business process including a relationship between an activity or sub-activity from a plurality of related activities and sub-activities and a business object from a plurality of related business objects, the relationship being defined such that at least a portion of the business object can be accessed based on the relationship between the activity or sub-activity and the business object; and
modifying the relationship between the activity or sub-activity and the business object such that the business process represents a business practice or method of performing a business process.

23. The method of claim 22, wherein the business process is associated with a first contextual business information before the modifying, the business process being associated with a second contextual business information after the modifying.

24. The method of claim 22, wherein the business object is a first business object,
the method further comprising:
defining, based on the business practice, a relationship between the activity or sub-activity from the plurality of related activities and sub-activities and a second business object from the plurality of related business objects, at least a portion of the second business object being accessed based on the relationship between the activity or sub-activity and the second business object.

* * * * *